Aug. 20, 1968     L. I. SCHLANK     3,397,409

TANK DISCHARGE VALVE

Filed March 17, 1966

INVENTOR.
LIONEL SCHLANK
BY Louis Necho
ATTORNEY.

United States Patent Office 3,397,409
Patented Aug. 20, 1968

3,397,409
TANK DISCHARGE VALVE
Lionel I. Schlank, Wyncote, Pa., assignor to Keystone Brass & Rubber Co., Inc., Hatboro, Pa., a corporation of Pennsylvania
Filed Mar. 17, 1966, Ser. No. 541,446
2 Claims. (Cl. 4—57)

ABSTRACT OF THE DISCLOSURE

A ball valve for a toilet flush tank characterized by a very flexible and loose mounting whereby the ball valve will always seat perfectly. The valve is made in two pieces; one secured to the overflow pipe and serving as a support, and another piece including the ball valve connected, and freely movable relative to the first piece.

---

This invention relates to a toilet bowl discharge valve of the general type set forth in United States Patent No. 2,741,775 and which is commercially known as a "flapper" valve.

A flapper valve of the type set forth includes a ball made of soft rubber and adapted to seat in the upper end of the drain pipe to close the latter, flexible arms extending from said ball and means for securing the free ends of said arms to the overflow pipe of the flush tank operatively to mount the flapper relative to the drain pipe.

The general object of this invention is to produce improved means for mounting a flapper valve of the type set forth.

A more specific object is to produce mounting means which permits unlimited freedom of movement of the valve ball to insure proper seating and water-tight closing of the drain pipe.

A still further object is to produce valve mounting means which can be made in one size but which will fit overflow pipes of different sizes and of different materials.

The full nature of the invention will be understood from the following specification and the accompanying drawings in which.

Figure 1:
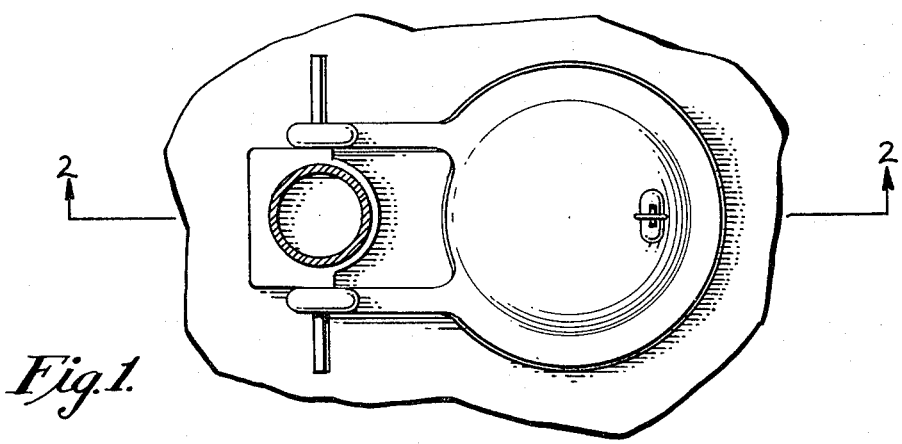
FIG. 1 is a top plan view of a flapper valve embodying the invention.
Figure 2:
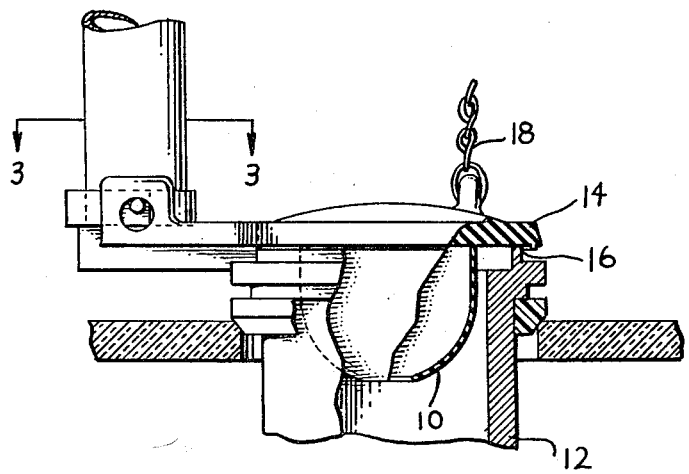
FIG. 2 is a view partly in side elevation and partly in vertical section looking in the direction of line 2—2 on FIG. 1.
Figure 3:
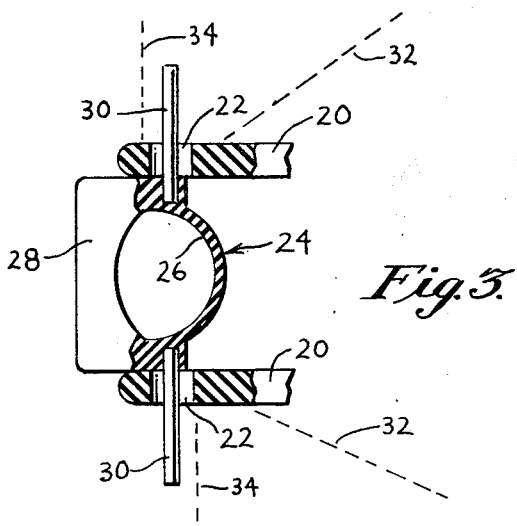
FIG. 3 is an enlarged view partly in top plan and partly in horizontal section looking in the direction of line 3—3 on FIG. 2.

The valve construction shown may be conventional in that it includes a ball 10 adapted to enter the top of drain pipe 12 and having a sealing flange 14 which is adapted to seat as at 16 to seal the upper end of the pipe. To the upper surface of the ball is attached the lower end of a chain 18, the upper end of which is connected to the usual lever which is not shown but which, when rotated, lifts the ball from its seat.

The valve also includes arms 20 which are integral with the ball and are provided with apertures 22. Arms 20 are made flexible enough to permit the ball to be lifted far enough to drain the tank in the usual manner, but they have enough resilience to move the ball down as soon as the buoyancy and turbulence within the tank have subsided enough to permit the ball to descend.

According to this invention the ball valve is secured in position by means of a collar 24 which is formed of a thin, readily stretchable portion 26 and a relatively thick, block 28 which serves as a handle and which provides the desired stability for manipulation and for the trunnions 30. The collar is made slightly elliptical so as to have a tight fit when it is stretched around the usually circular overflow pipe. It will be noted that the diameters of openings 22 are materially larger than the diameter of trunnions 30 so that arms 20 can rotate about the axes of the trunnions and can move longitudinally of the trunnions and in other directions, freely and without any restraint. This gives the ball valve complete freedom of movement in response to gravity and in response to the whirlpool effect produced by the water flowing into the pipe. In practice, I have found that a valve ball so mounted, will seat more effectively and over a longer period of time than a ball valve not possessing the degree of freedom of movement which the present construction provides. Also, the trunnions are made long enough and openings 22 are made large enough so that, no matter how far the valve assembly moves in the direction of broken lines 34, 32, or in any other direction, the arms 20 will not bind nor will they slip off the trunnions. For a trunnions of 1/8" diameter, the openings 22 can be of 1/4" diameter. In this connection, it is pointed out that the drawings are not to scale.

What I claim is:
1. A ball valve assembly for use in a tank having a drain pipe and an over-flow pipe,
said valve assembly including:
a ball adapted to close said drain pipe,
a stretchable collar adapted to be slipped over said over-flow pipe,
said collar including a relatively thick body portion and a relatively thin, readily stretchable portion,
a pair of trunnions carried by and projecting beyond said thick portion, and
a pair of arms carried by said ball,
said arms having openings for receiving said trunnions, the diameters of said openings being large enough to permit free, multi-directional movement of said arms relative to said overflow pipe.

2. The assembly defined in claim 1 wherein the diameter of said openings is substantially twice the diameter of said trunnions and wherein the length of said trunnions is much greater than the cross-sectional tihckness of said arms measured at said openings, whereby said arms will not be disengaged from said trunnions regardless of any movement of said ball valve assembly.

References Cited

UNITED STATES PATENTS

| | | | |
|---|---|---|---|
| 2,142,393 | 1/1939 | Halteman | 4—57 |
| 2,598,967 | 6/1952 | Bennett | 4—57 |
| 2,741,775 | 4/1956 | Schmidt | 4—57 |
| 2,767,406 | 10/1956 | Bennett | 4—57 |
| 2,776,437 | 1/1957 | Detjen | 4—57 |
| 2,787,004 | 4/1957 | Zinkil et al. | 4—56 |
| 2,970,319 | 2/1961 | Lassiter | 4—57 |
| 3,121,234 | 2/1964 | Micek | 4—56 |
| 3,154,794 | 11/1964 | Antunez | 4—57 |
| 3,167,787 | 2/1965 | Connealy | 4—57 |

LAVERNE D. GEIGER, *Primary Examiner.*
D. MASSENBERG, *Assistant Examiner.*